(12) United States Patent
Deng

(10) Patent No.: US 9,514,640 B2
(45) Date of Patent: *Dec. 6, 2016

(54) INFORMATION PROCESSING METHOD AND USER EQUIPMENT

(71) Applicant: Huawei Device Co., Ltd., Shenzhen (CN)

(72) Inventor: Junjie Deng, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,285

(22) Filed: Aug. 11, 2015

(65) Prior Publication Data

US 2015/0350408 A1     Dec. 3, 2015

Related U.S. Application Data

(63) Continuation of application No. 13/691,428, filed on Nov. 30, 2012, now Pat. No. 9,142,121, which is a
(Continued)

(30) Foreign Application Priority Data

May 31, 2010   (CN) .......................... 2010 1 0188549

(51) Int. Cl.
*G08B 23/00*     (2006.01)
*G08C 17/02*     (2006.01)
(Continued)

(52) U.S. Cl.
CPC .......... *G08C 17/02* (2013.01); *H04M 1/72547* (2013.01); *H04M 1/72569* (2013.01); *H04M 19/042* (2013.01); *H04M 2250/12* (2013.01)

(58) Field of Classification Search
CPC .. H04M 1/6066; H04M 1/585; H04M 1/6058; H04M 1/72547; H04M 1/72563; H04M 1/72569; H04M 2250/12; H04M 2250/52; E04H 1/14; G08C 17/02; H04L 51/02; H04L 51/38; H04L 5/003; G06F 1/1626
(Continued)

(56) References Cited

U.S. PATENT DOCUMENTS 9,142,121 B2 *  9/2015 Deng ................ H04M 1/72547
2002/0127998 A1  9/2002 Katayanagi
(Continued)

FOREIGN PATENT DOCUMENTS

CN       1332590 A    1/2002
CN       1678183 A    10/2005
(Continued)

OTHER PUBLICATIONS

Partial English Translation and Abstract of Chinese Patent Application No. CN101009887, Jul. 31, 2015, 4 pages.
Partial English Translation and Abstract of Chinese Patent Application No. CN101640723, Jul. 31, 2015, 5 pages.
Partial English Translation and Abstract of Chinese Patent Application No. CN101227666, Nov. 23, 2015, 8 pages.
(Continued)

*Primary Examiner* — Daniel Previl
(74) *Attorney, Agent, or Firm* — Conley Rose, P.C.

(57) ABSTRACT

An information processing method and a user equipment, wherein the method includes receiving an information processing request message, if the information processing request message is not processed within a predetermined time, collecting at least one type of environment state information, generating prompt information according to the at least one type of the collected environment state information. Therefore, a user can perceive in time the information processing request message that has been received but not processed by the user equipment in time, and thus effectively increasing the usability of the user equipment.

22 Claims, 5 Drawing Sheets

Related U.S. Application Data continuation of application No. PCT/CN2011/074939, filed on May 31, 2011.

(51) Int. Cl.
*H04M 19/04* (2006.01)
*H04M 1/725* (2006.01)

(58) Field of Classification Search
USPC .............. 340/870.02, 7.61, 521, 539.22, 426.2,340/426.21, 426.22, 474, 502, 683, 692, 310.13,340/815.79
See application file for complete search history.

(56) References Cited

U.S. PATENT DOCUMENTS

| | | | |
|---|---|---|---|
| 2002/0137552 A1 | 9/2002 | Cannon et al. | |
| 2002/0143638 A1* | 10/2002 | August | G06Q 20/12 705/14.27 |
| 2003/0188452 A1* | 10/2003 | Hines | A43B 3/0021 36/7.1 R |
| 2004/0203673 A1 | 10/2004 | Seligmann | |
| 2006/0073787 A1* | 4/2006 | Lair | H04M 1/6066 455/41.1 |
| 2006/0205364 A1 | 9/2006 | Chen | |
| 2006/0293037 A1 | 12/2006 | Signore | |
| 2007/0139183 A1 | 6/2007 | Kates | |
| 2007/0149253 A1 | 6/2007 | Lee et al. | |
| 2007/0182524 A1 | 8/2007 | Tushinsky et al. | |
| 2007/0186490 A1* | 8/2007 | Salemi | E04H 1/14 52/27.5 |
| 2007/0192067 A1 | 8/2007 | Wong et al. | |
| 2008/0132290 A1 | 6/2008 | Sharabi et al. | |
| 2009/0088204 A1 | 4/2009 | Culbert et al. | |
| 2009/0186654 A1 | 7/2009 | Chen et al. | |
| 2010/0279661 A1 | 11/2010 | Furuta et al. | |
| 2013/0099939 A1 | 4/2013 | Deng | |

FOREIGN PATENT DOCUMENTS

| | | |
|---|---|---|
| CN | 1980258 A | 6/2007 |
| CN | 101009887 A | 8/2007 |
| CN | 101227666 A | 7/2008 |
| CN | 101252735 A | 8/2008 |
| CN | 101341521 A | 1/2009 |
| CN | 101640723 A | 2/2010 |
| CN | 101854435 A | 10/2010 |
| EP | 1379064 A2 | 1/2004 |
| JP | 2002261882 A | 9/2002 |
| JP | 2002325115 A | 11/2002 |
| JP | 2006295554 A | 10/2006 |
| JP | 2006303565 A | 11/2006 |
| JP | 2009171302 A | 7/2009 |
| JP | 2009206868 A | 9/2009 |
| JP | 2009290304 A | 12/2009 |

OTHER PUBLICATIONS

Partial English Translation and Abstract of Japanese Patent Application No. JPA2009206868, Nov. 30, 2015, 34 pages.
Partial English Translation and Abstract of Japanese Patent Application No. JP2002325115, Part 1, Oct. 13, 2015, 6 pages.
Partial English Translation and Abstract of Japanese Patent Application No. JP2002325115, Part 2, Oct. 13, 2015, 3 pages.
Partial English Translation and Abstract of Japanese Patent Application No. JP2006295554, Part 1, Oct. 13, 2015, 14 pages.
Partial English Translation and Abstract of Japanese Patent Application No. JP2006295554, Part 2, Oct. 13, 2015, 2 pages.
Partial English Translation and Abstract of Japanese Patent Application No. JP2006303565, Part 1, Oct. 13, 2015, 5 pages.
Partial English Translation and Abstract of Japanese Patent Application No. JP2006303565, Part 2, Oct. 13, 2015, 3 pages.
Partial English Translation and Abstract of Japanese Patent Application No. JP2009290304, Part 1, Oct. 13, 2015, 8 pages.
Partial English Translation and Abstract of Japanese Patent Application No. JP2009290304, Part 2, Oct. 13, 2015, 3 pages.
Foreign Communication From a Counterpart Application, Japanese Application No. 2013-512743, Japanese Notice of Allowance dated Mar. 11, 2014, 3 pages.
Foreign Communication From a Counterpart Application, PCT Application No. PCT/CN2011/074939, English Translation of International Search Report dated Sep. 1, 2011, 3 pages.
Foreign Communication From a Counterpart Application, PCT Application No. PCT/CN2011/074939, English Translation of Written Opinion dated Sep. 1, 2011, 5 pages.
Foreign Communication From a Counterpart Application, Japanese Application No. 2014-024652, Japanese Office Action dated Apr. 14, 2015, 3 pages.
Foreign Communication From a Counterpart Application, Japanese Application No. 2014-024652, English Translation of Japanese Office Action dated Apr. 14, 2015, 3 pages.
Foreign Communication From a Counterpart Application, European Application No. 11789193.7, Extended European Search Report dated May 21, 2013, 7 pages.
Foreign Communication From a Counterpart Application, Chinese Application No. 201210223022.5, Chinese Office Action dated Mar. 28, 2014, 4 pages.
Foreign Communication From a Counterpart Application, Chinese Application No. 201210223022.5, Chinese Office Action dated Aug. 12, 2013, 4 pages.
Foreign Communication From a Counterpart Application, Chinese Application No. 201210223022.5, Chinese Search Report dated Aug. 2, 2013, 2 pages.
Foreign Communication From a Counterpart Application, European Application No. 11789193.7, European Office Action dated Jan. 23, 2014, 6 pages.
Office Action dated Aug. 7, 2014, 8 pages, U.S. Appl. No. 13/691,428, filed on Nov. 30, 2012.
Office Action dated Dec. 10, 2014, 9 pages, U.S. Appl. No. 13/691,428, filed on Nov. 30, 2012.
Notice of Allowance dated May 14, 2015, 8 pages, U.S. Appl. No. 13/691,428, filed on Nov. 30, 2012.

* cited by examiner

INFORMATION PROCESSING METHOD AND USER EQUIPMENT

CROSS-REFERENCE TO RELATED APPLICATIONS

This application is a continuation of U.S. patent application Ser. No. 13/691,428, filed on Nov. 30, 2012, which is a continuation of International Application PCT/CN2011/074939, filed on May 31, 2011, which claims priority to Chinese Patent Application No. 201010188549.X, filed on May 31, 2010. The afore-mentioned patent applications are hereby incorporated by reference in their entireties.

TECHNICAL FIELD

The present disclosure relates to the field of communications, and in particular, to an information processing method and a user equipment.

BACKGROUND

Because of the characteristics such as mobility and facility, a user equipment such as a mobile phone is widely used by users.

At present, when a new event such as an incoming call, an incoming message or a schedule occurs on a mobile phone, the mobile phone usually makes the user perceive the new event through a mobile phone ring or vibration. When the user is walking and the surrounding environment is very noisy, if the mobile phone receives a new event at this moment, the user may be unable to perceive the ring or vibration triggered by the mobile phone, and thus the new event received by the mobile phone may not be processed in time. Even when the user walks to a quiet place or stands still, if the user does not watch the mobile phone, the user will not perceive such new events that are not processed in time. Additionally, when coming back home, the user usually puts the mobile phone in a place such as the bedroom, and then goes to the living room to watch television (TV), if a new event occurs on the mobile phone at this moment, the user may be unable to perceive the ring or vibration triggered by the mobile phone. Moreover, when returning to the bedroom, if the user does not watch the mobile phone, the user still cannot perceive the new events that are not processed in time.

During the implementation of the present disclosure, the inventors find that there at least exist the following problems: a user is often unable to process in time the new event received by the user equipment, the usability of the user equipment is poor, and thus great inconvenience is brought to the user.

SUMMARY

The embodiments of the present disclosure provide an information processing method and a user equipment, which are applied to overcome the drawbacks that a user is unable to in time process a new event received by the user equipment, thereby the usability of the user equipment may be effectively improved.

One embodiment of the present disclosure provides an information processing method, which includes receiving an information processing request message, collecting at least one type of environment state information if the information processing request message is not processed within a first predetermined time, and generating a prompt information, according to the at least one type of collected environment state information, so as to prompt a user to process the information processing request message.

One embodiment of the present disclosure provides a user equipment, which includes a receiving module, for receiving an information processing request message, a first collecting module, for collecting at least one type of environment state information if the information processing request message is not processed within a first predetermined time, and a first generating module, for generating a prompt information, according to the at least one type of collected environment state information, so as to prompt a user to process the information processing request message.

For the information processing method and the user equipment according to the embodiments of the present disclosure, if an information processing request message received by the user equipment is not processed within a first predetermined time, at least one type of environment state information will be collected, and a prompt information will be generated according to the at least one type of collected environment state information so as to prompt a user to process the information processing request message, and thus the user equipment may generate a prompting information, according to an identified environment state in which the user equipment is, so as to prompt the user to process the information processing request message, thereby the user can be made to in time perceive the information processing request message that has been received by the user equipment but not processed in time, and thus the usability of the user equipment may be effectively improved.

BRIEF DESCRIPTION OF THE DRAWINGS

In order to more clearly illustrate the technical solutions of the embodiments of the disclosure, the drawings needed in the description of the embodiments are briefly introduced below. The drawings in the description below are only some embodiments of the disclosure, and other drawings may also be obtained by one of ordinary skills in the art according to these drawings without creative work.

DETAILED DESCRIPTION OF DRAWINGS

In order to make the objects, technical solutions and advantages of the embodiments of the disclosure clearer, the following describes the technical solutions in the embodiments of the disclosure clearly and fully in conjunction with the drawings in the embodiments of the disclosure. The embodiments described are only a part of the embodiments of the disclosure, rather than being the whole embodiments. All the other embodiments obtained by one of ordinary skills in the art based on the embodiments of the disclosure without creative work pertain to the protection scope of the disclosure.

Figure 1:
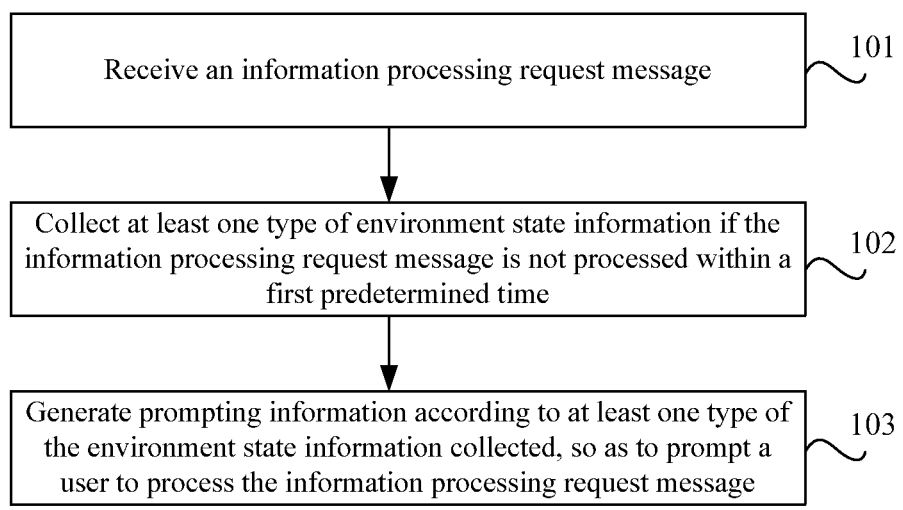
FIG. 1 is a flowchart of the information processing method according to an embodiment of the disclosure.

FIG. 1 is a flowchart of an information processing method according to an embodiment of the disclosure. As shown in FIG. 1, the method according to this embodiment includes Step 101: Receive an information processing request message.

In this embodiment, a user equipment receives an information processing request message, wherein the information processing request message may be a call, a short message or a schedule, etc. The user equipment may be a mobile phone, etc.

Step 102: Collect at least one type of environment state information if the information processing request message is not processed within a first predetermined time.

In this embodiment, when the user equipment receives an information processing request message, if the user does not process the information processing request message through the user equipment within a first predetermined time, the user equipment is triggered to collect at least one type of environment state information, wherein the environment state information may be the information obtained by collecting the movement of the user equipment, the sound in the environment and/or the light in the environment of the user equipment, etc. In this embodiment, the first predetermined time may be set according to a requirement of the user.

Step 103: Generate prompting information according to the collected environment state information, so as to prompt the user to process the information processing request message.

In this embodiment, the prompting information may be a special ring and/or vibration. The user equipment generates the special ring and/or vibration according to the collected environment state information, so as to prompt the user to process the information processing request message. In this embodiment, the specific mode in which the user equipment prompts the user is not limited.

In this embodiment, if the information processing request message received by the user equipment is not processed within the first predetermined time, at least one type of environment state information is collected, and the prompting information is generated according to the collected environment state information, so as to prompt the user to process the information processing request message, and thus the user equipment may generate the prompting information according to an identified environment state in which the user equipment is, so as to prompt the user to process the information processing request message, thereby the user can perceive in time the information processing request message that has been received by the user equipment but not processed in time. Thus, the usability of the user equipment is effectively improved.

Moreover, in another embodiment of the information processing method, step 103 may be the following generating the prompting information if at least one type of collected environment state information meets a preset condition, wherein the environment state information includes one or any combination of the following information: the first gravity sensing information, the first sound sensing information and the first light sensing information, and the preset condition includes at least one type of the following conditions: the first gravity sensing information is smaller than a preset vibration amplitude, the first sound sensing information is smaller than a preset decibel, and the first light sensing information is greater than a preset light intensity.

The preset condition may be the following seven preset conditions First preset condition: the first gravity sensing information is smaller than a preset vibration amplitude.

Under this preset condition, when one type of environment state information collected by the user equipment is the first gravity sensing information, if the first gravity sensing information meets the first preset condition, it indicates that the user equipment is in a still state currently, so that the user equipment is triggered to generate the prompting information. For example, when the user is running, the user may be unable to perceive the vibration triggered by the user equipment according to the received information processing request message. When the user stops to rest, the first gravity sensing information collected by the user equipment meets the first preset condition, so that the user equipment is triggered to generate the prompting information.

Second preset condition: the first sound sensing information is smaller than a preset decibel.

Under this preset condition, when one type of environment state information collected by the user equipment is the first sound sensing information, if the first sound sensing information meets the second preset condition, it indicates that the user equipment is in a quiet environment currently, so that the user equipment is triggered to generate the prompting information. For example, if the working environment of the user is noisy, when the user works under this environment, the user may be unable to perceive the ring triggered by the user equipment according to the received information processing request message. When the user walks out of this working environment and enters a quiet sound environment, the first sound sensing information collected by the user equipment meets the second preset condition, so that the user equipment is triggered to generate the prompting information.

Third preset condition: the first light sensing information is greater than a preset light intensity.

Under this preset condition, when one type of environment state information collected by the user equipment is the first light sensing information, if the first light sensing information meets the third preset condition, it indicates that the user equipment is in a bright environment currently, so that the user equipment is triggered to generate the prompting information. For example, the user is used to put the user equipment in a bag, so the user may be unable to perceive the vibration triggered by the user equipment according to the received information processing request message. When the user opens the bag to take out something, light enters the bag, and at this moment, the first light sensing information collected by the user equipment meets the third preset condition, so that the user equipment is triggered to generate the prompting information.

Fourth preset condition: the first gravity sensing information is smaller than a preset vibration amplitude, and the first sound sensing information is smaller than a preset decibel.

Under this preset condition, when the two types of environment state information collected by the user equipment are the first gravity sensing information and the first sound sensing information, if the first gravity sensing information and the first sound sensing information meet the fourth preset condition, it indicates that the user equipment is in a still state and the user equipment is in a quiet environment currently, so that the user equipment is triggered to generate the prompting information. For example, when the user walks in a place under a noisy environment, the user may be unable to perceive the ring and/or vibration triggered by the user equipment according to the received information processing request message. When the user rests under a quiet environment, the first gravity sensing information and the first sound sensing information collected by the user equipment meet the fourth preset condition, so that the user equipment is triggered to generate the prompting information.

Fifth preset condition: the first gravity sensing information is smaller than a preset vibration amplitude, and the first light sensing information is greater than a preset light intensity, Under this preset condition, when the two types of environment state information collected by the user equipment are the first gravity sensing information and the first light sensing information, if the first gravity sensing information and the first light sensing information meet the fifth preset condition, it indicates that the user equipment is in a still state and the user equipment is in a bright environment currently, so that the user equipment is triggered to generate the prompting information. For example, when the user walks and puts the user equipment in a bag, the user may be unable to perceive the vibration triggered by the user equipment according to the received information processing request message. When the user stops to take out something from the bag, light enters the bag, the first gravity sensing information and the first light sensing information collected by the user equipment meet the fifth preset condition, so that the user equipment is triggered to generate the prompting information.

Sixth preset condition: the first sound sensing information is smaller than a preset decibel, and the first light sensing information is greater than a preset light intensity, Under this preset condition, when the two types of environment state information collected by the user equipment are the first sound sensing information and the first light sensing information, if the first sound sensing information and the first light sensing information meet the sixth preset condition, it indicates that the user equipment is in a quiet and bright environment currently, so that the user equipment is triggered to generate the prompting information. For example, when the user puts the mobile phone in a bag and stays in a place under a noisy environment, the user may be unable to perceive the ring and/or vibration triggered by the user equipment according to the received information processing request message. When the user opens the bag to take out something under a quiet environment, light enters the bag, the first sound sensing information and the first light sensing information collected by the user equipment meet the sixth preset condition, so that the user equipment is triggered to generate the prompting information.

Seventh preset condition: the first gravity sensing information is smaller than a preset vibration amplitude, the first sound sensing information is smaller than a preset decibel, and the first light sensing information is greater than a preset light intensity.

Under this preset condition, when the three types of environment state information collected by the user equipment are the first gravity sensing information, the first sound sensing information and the first light sensing information, it indicates that the user equipment is in a still state and the user equipment is in a quiet and bright environment currently, so that the user equipment is triggered to generate the prompting information. For example, when the user puts the mobile phone in a bag and walks in a place under a noisy environment, the user may be unable to perceive the ring and/or vibration triggered by the user equipment according to the received information processing request message. When the user stops under a quiet environment and opens the bag to take out something, light enters the bag, the first gravity sensing information, the first sound sensing information and the first light sensing information collected by the user equipment meet the seventh preset condition, so that the user equipment is triggered to generate the prompting information.

In this embodiment, the first gravity sensing information may be the information obtained by the user equipment by collecting the movement status of the user equipment itself. The first sound sensing information may be the information obtained by the user equipment by collecting the sound of the environment in which the user equipment exists. The first light sensing information may be the information obtained by the user equipment by collecting the light of the environment in which the user equipment exists.

It should be noted that in the embodiment, the content of the preset conditions is not limited, and the preset conditions are not limited to the foregoing mentioned conditions. One skilled in the art may arbitrarily set the content of the preset conditions according to the requirements of the environment, etc.

Moreover, in another embodiment of the information processing method, the method may further include continuing to collect the environment state information if the collected environment state information fails to meet the preset condition.

When the three types of environment state information collected by the user equipment are the first gravity sensing information, the first sound sensing information and the first light sensing information, and such three types of environment state information fail to meet the seventh preset condition, for example, the first gravity sensing information is greater than the preset vibration amplitude, the first sound sensing information is greater than the preset decibel, and the first light sensing information is greater than the preset light intensity, then the user equipment may continue to collect these three types of environment state information.

Alternatively, the method may further include continuing to collect a part of the environment state information if the collected environment state information fails to meet the preset condition. The part of the environment state information includes: all the environment state information which fails to meet the preset condition in the environment state information; or a part of the environment state information which fails to meet the preset condition in the environment state information; or a part of environment state information selected from the environment state information.

There may be the following several modes for implementing the step of continuing to collect a part of the environment state information if the collected environment state information fails to meet the preset condition First implementing mode: when the three types of environment state information collected by the user equipment are the first gravity sensing information, the first sound sensing information and the first light sensing information, and such three types of environment state information fail to meet the seventh preset condition, for example, the user walks in a place under a noisy and bright environment, that is, the first gravity sensing information is greater than the preset vibration amplitude, the first sound sensing information is greater than the preset decibel, and the first light sensing information is greater than the preset light intensity, the user may be unable to perceive the ring and/or vibration triggered by the user equipment according to the received information processing request message, then the user equipment may continue to collect the first gravity sensing information and the first sound sensing information. When the user stops to rest under a quiet environment, the first gravity sensing information collected by the user equipment is smaller than the preset vibration amplitude and the first sound sensing information is smaller than the preset decibel, at this moment, the user may perceive the ring and/or vibration triggered by the user equipment according to the received information processing request message, so that the user equipment generates the prompting information to remind the user of the information processing request message that is not processed in time.

Second implementing mode: when the three types of environment state information collected by the user equipment are the first gravity sensing information, the first sound sensing information and the first light sensing information, and such three types of environment state information fail to meet the seventh preset condition, for example, the user walks in a place under a noisy and bright environment, that is, the first gravity sensing information is greater than the preset vibration amplitude, the first sound sensing information is greater than the preset decibel, and the first light sensing information is greater than the preset light intensity, the user may be unable to perceive the ring and/or vibration triggered by the user equipment according to the received information processing request message, then the user equipment may continue to collect the first gravity sensing information. When the user stops to rest, the first gravity sensing information collected by the user equipment is smaller than the preset vibration amplitude, at this moment, the user may perceive the vibration triggered by the user equipment according to the received information processing request message, so that the user equipment generates the prompting information to remind the user of the information processing request message that is not processed in time.

Third implementing mode: when the three types of environment state information collected by the user equipment are the first gravity sensing information, the first sound sensing information and the first light sensing information, and such three types of environment state information fail to meet the seventh preset condition, for example, the user puts the user equipment in a bag and then puts the bag on a table, and the user equipment is in a noisy environment, that is, the first gravity sensing information is smaller than the preset vibration amplitude, the first sound sensing information is greater than the preset decibel, and the first light sensing information is smaller than the preset light intensity, the user may be unable to perceive the ring and/or vibration triggered by the user equipment according to the received information processing request message, then the user equipment may continue to collect the first gravity sensing information and the first light sensing information. When the user takes up the bag from the table and takes out something from the bag, the first gravity sensing information collected by the user equipment is greater than the preset vibration amplitude, and the first light sensing information is greater than the preset light intensity, at this moment, the user may perceive the ring triggered by the user equipment according to the received information processing request message, so that the user equipment generates the prompting information to remind the user of the information processing request message that is not processed in time.

It should be noted that in this embodiment, when the collected environment state information fails to meet the preset condition, the environment state information or the part of the environment state information that the user equipment continues to collect is not limited, and one skilled in the art may arbitrarily collect the environment state information according to the requirements of the environment, etc.

Figure 2:
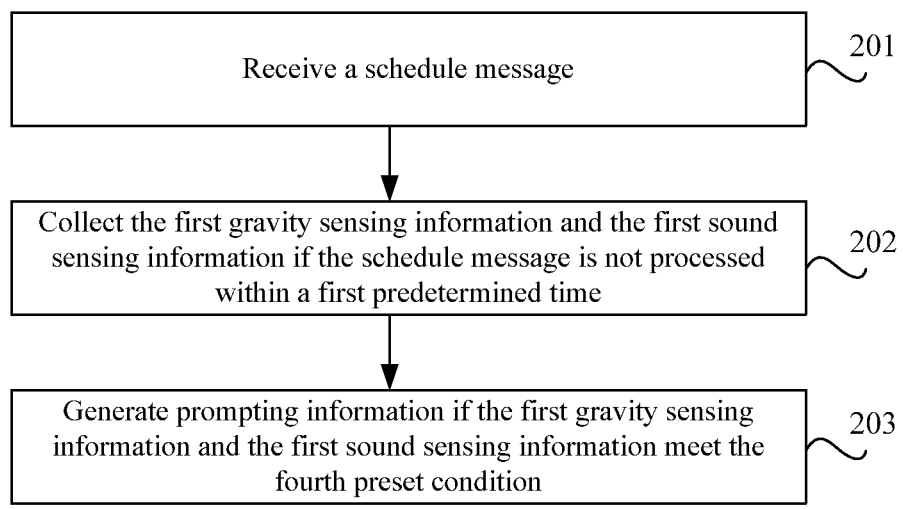
FIG. 2 is a flowchart of the information processing method according to another embodiment of the disclosure.

FIG. 2 is a flowchart of the information processing method according to another embodiment of the disclosure. As shown in FIG. 2, in this embodiment, the technical solution of the embodiment is described in detail by using an example in which the two types of environment state information collected by the user equipment are the first gravity sensing information and the first sound sensing information and the preset condition is the fourth preset condition. The method according to this embodiment includes Step 201: Receive a schedule message.

In this embodiment, the implementing mode of step 201 is similar to that of step 101 shown in FIG. 1, so it is not described again here.

Step 202: Collect the first gravity sensing information and the first sound sensing information if the schedule message is not processed within a first predetermined time.

In this embodiment, for example, the user equipment is a mobile phone, and the user of the user equipment is on the way to a bus station on foot, the mobile phone receives a schedule message and reminds the user through a ring and/or vibration triggered by the mobile phone. However, because the user is walking and the surrounding environment is very noisy, the user does not perceive the ring and/or vibration triggered by the mobile phone according to the received schedule message. Within the first predetermined time, the mobile phone identifies that the schedule message has not been processed by the user, so that the mobile phone is triggered to collect the first gravity sensing information and the first sound sensing information.

Step 203: Generate the prompting information if the first gravity sensing information and the first sound sensing information meet the fourth preset condition.

In this embodiment, when the user comes back home or is in an elevator, the mobile phone is in a still state at this moment and the surrounding environment is very quiet, so that the mobile phone identifies that the first gravity sensing information is smaller than the preset vibration amplitude and the first sound sensing information is smaller than the preset decibel, thereby the mobile phone identifies that under the current environment of the mobile phone, the user may perceive the ring and/or vibration prompt triggered by the mobile phone. Therefore, the mobile phone generates a special ring and/or vibration to prompt the user that there exists a schedule message that is not processed in time.

It should be noted that, when the user walks on his way and the surrounding environment is very noisy, the mobile phone identifies that the first gravity sensing information and the first sound sensing information fail to meet the fourth preset condition, for example, the first gravity sensing information is greater than the preset vibration amplitude and the first sound sensing information is greater than the preset decibel, so that the mobile phone identifies that under the current environment of the mobile phone, the user is unable to perceive the ring and/or vibration prompt triggered by the mobile phone. Therefore, the mobile phone does not generate a special ring and/or vibration prompt at this moment. Then, the method may further include continuing to collect the first gravity sensing information and the first sound sensing information if the first gravity sensing information and the first sound sensing information fail to meet the fourth preset condition.

Alternatively, the method may further include continuing to collect the first gravity sensing information or the first sound sensing information if the first gravity sensing information and the first sound sensing information fail to meet the fourth preset condition.

If the first gravity sensing information and the first sound sensing information fail to meet the fourth preset condition, the mobile phone may further continue to collect the first gravity sensing information; if the collected first gravity sensing information is smaller than the preset vibration amplitude, the mobile phone generates the prompting information. For example, when the user stops to rest under a noisy environment, at this moment, the first gravity sensing information collected by the mobile phone is smaller than the preset vibration amplitude, then the mobile phone identifies that the mobile phone is in a still environment currently and the user may perceive the vibration triggered by the mobile phone, and thus the mobile phone generates the prompting information to prompt the user that there exists a schedule message that is not processed in time.

If the first gravity sensing information and the first sound sensing information fail to meet the fourth preset condition, the mobile phone may further continue to collect the first sound sensing information, if the collected first sound sensing information is smaller than the preset decibel, the mobile phone generates the prompting information. For example, when the user walks from a noisy environment into a quiet environment, at this moment, the first sound sensing information collected by the mobile phone is smaller than the preset decibel, then the mobile phone identifies that the mobile phone is in a quiet environment and the user may perceive the ring triggered by the mobile phone, and thus the mobile phone generates the prompting information to prompt the user that there exists a schedule message that is not processed in time.

In this embodiment, if the information processing request message received by the user equipment is not processed within a first predetermined time, the user equipment collects the first gravity sensing information and the first sound sensing information. If the first gravity sensing information and the first sound sensing information meet the fourth preset condition, the user equipment generates the prompting information according to the first gravity sensing information and the first sound sensing information, so that the user equipment identifies whether the user may perceive the prompting information generated by the user equipment according to the movement status of the user equipment itself and the sound in the environment in which the user equipment exists, thereby in the case that the user can perceive the prompting information generated by the user equipment, the user equipment is triggered to generate the prompting information to prompt the user to process the information processing request message. Thus, the user can be effectively made to in time perceive the information processing request message that has been received by the user equipment but not processed in time, and the usability of the user equipment can be effectively improved.

Figure 3:
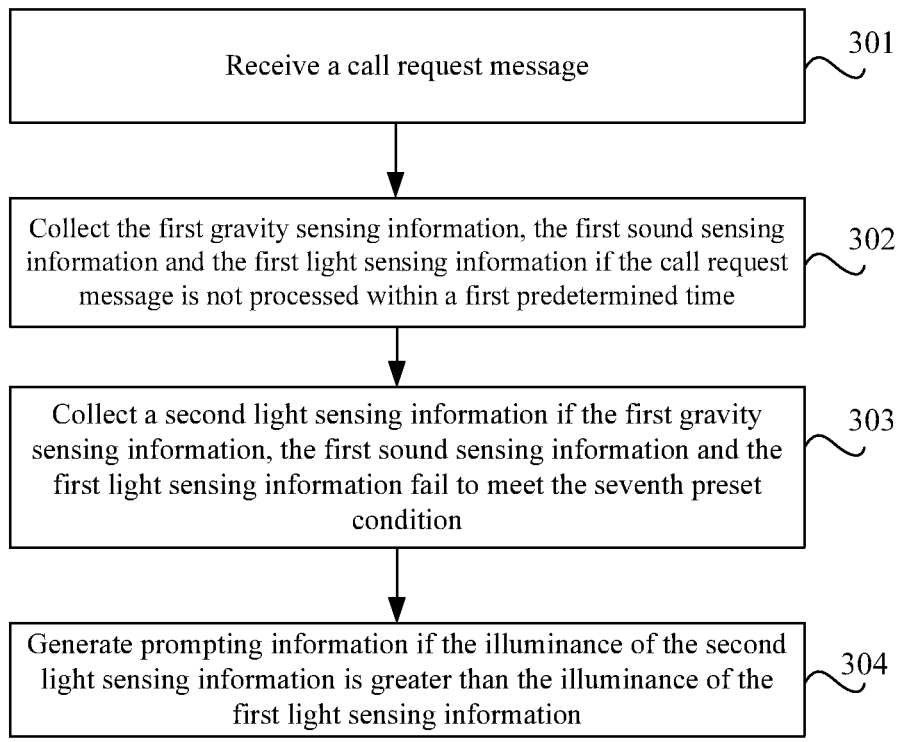
FIG. 3 is a flowchart of the information processing method according to yet another embodiment of the disclosure.

FIG. 3 is a flowchart of the information processing method according to yet another embodiment of the disclosure. As shown in FIG. 3, in this embodiment, the technical solution of the embodiment is described in detail by using an example in which the three types of environment state information collected by the user equipment are the first gravity sensing information, the first sound sensing information and the first light sensing information, and the preset condition is the seventh preset condition. The method of this embodiment includes Step 301: Receive a call request message.

In this embodiment, the implementing mode of step 301 is similar to that of step 101 shown in FIG. 1, so it is not described again here.

Step 302: Collect the first gravity sensing information, the first sound sensing information and the first light sensing information if the call request message is not processed within a first predetermined time.

In this embodiment, a user puts the mobile phone in the bedroom and then goes to watch TV in the living room. Because the volume of the TV program is high, when the mobile phone receives a call request, the user that is watching TV in the living room does not perceive the ring and/or vibration triggered by the mobile phone. Moreover, the call request message is not processed within the first predetermined time, that is, the mobile phone identifies that the user does not in time process the call request message, so that the mobile phone is triggered to collect the first gravity sensing information, the first sound sensing information and the first light sensing information.

Step 303: Collect second light sensing information if the first gravity sensing information, the first sound sensing information and the first light sensing information fail to meet the seventh preset condition.

In this embodiment, because the first gravity sensing information, the first sound sensing information and the first light sensing information fail to meet the seventh preset condition, the mobile phone identifies that under the current environment, the user cannot perceive the ring and/or vibration triggered by the mobile phone, at this moment, the mobile phone may detect, in real time, the light environment in which the mobile phone exists, that is, the mobile phone may collect the second light sensing information in real time. In this embodiment, the mobile phone may identify, according to the first gravity sensing information, the first sound sensing information and the collected first light sensing information, that the current environment of the mobile phone is noisy and the light environment is dim.

Step 304: Generate the prompting information if the light intensity of the second light sensing information is greater than the light intensity of the first light sensing information.

In this embodiment, when the user returns to the bedroom for something and turns on the light in the bedroom, at this moment, the light intensity of the second light sensing information collected by the mobile phone is greater than the light intensity of the first light sensing information, that is, the mobile phone identifies that at this moment, the light environment in which the mobile phone exists changes from dim to bright, so that the mobile phone identifies that the user may perceive the ring and/or vibration triggered by the mobile phone, thereby the mobile phone is triggered to cause a special ring and/or vibration to prompt the user of the call request message in the mobile phone that is not processed in time.

In this embodiment, if the information processing request message received by the user equipment is not processed within the first predetermined time, the user equipment collects the first gravity sensing information, the first sound sensing information and the first light sensing information. If the first gravity sensing information, the first sound sensing information and the first light sensing information fail to meet the seventh preset condition, the user equipment collects the second light sensing information in real time. If the light intensity of the second light sensing information is greater than the light intensity of the first light sensing information, the user equipment generates the prompting information, so that the mobile phone can be triggered to generate the prompting information according to the movement status of the mobile phone itself, the change of the light and the sound in the environment in which the mobile phone exists, thereby the user can in time perceive the information processing request message that has been received by the user equipment but not processed in time, and therefore, the usability of the user equipment may also be effectively improved.

Figure 4:
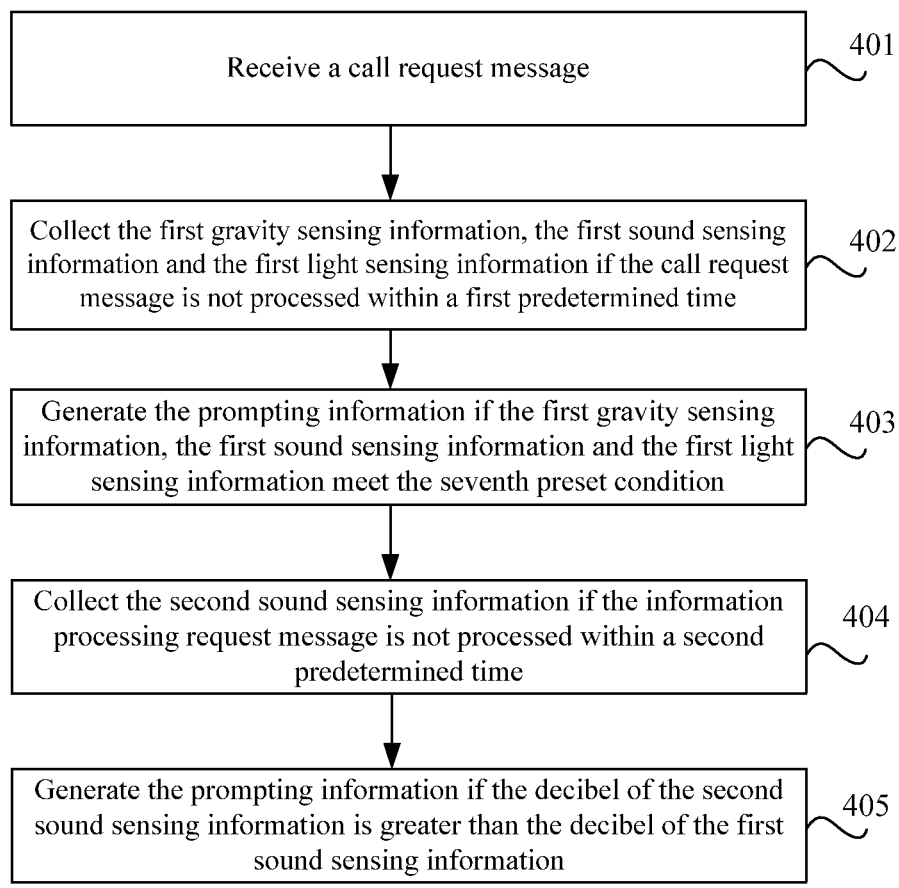
FIG. 4 is a flowchart of the information processing method according to still another embodiment of the disclosure.

FIG. 4 is a flowchart of the information processing method according to still another embodiment of the disclosure. As shown in FIG. 4, in this embodiment, the technical solution of the embodiment is described in detail by using an example in which the three types of environment state information collected by the user equipment are the first gravity sensing information, the first sound sensing information and the first light sensing information, and the preset condition is the seventh preset condition. The method of this embodiment includes Step 401: Receive a call request message.

In this embodiment, the implementing mode of step 401 is similar to that of step 101 shown in FIG. 1, so it is not described again here.

Step 402: Collect the first gravity sensing information, the first sound sensing information and the first light sensing information if the call request message is not processed within a first predetermined time.

In this embodiment, when coming back home, a user puts the mobile phone in the bedroom and then goes to another room. When the mobile phone receives a call request message, because the user is in another room, the user does not perceive the ring and/or vibration triggered by the mobile phone due to the received call request message, and the user does not process the call request message received by the mobile phone within the first predetermined time, and thus the mobile phone identifies that the user does not in time process the call request message, so that the mobile phone is triggered to collect the first gravity sensing information, the first sound sensing information and the first light sensing information.

Step 403: Generate the prompting information if the first gravity sensing information, the first sound sensing information and the first light sensing information meet the seventh preset condition.

In this embodiment, when the mobile phone identifies that the first gravity sensing information is smaller than the preset vibration amplitude, the first sound sensing information is smaller than the preset decibel and the first light sensing information is greater than the preset light intensity, the mobile phone identifies that the sound environment in which the mobile phone exists is very quiet and the light environment is very bright, so that the mobile phone identifies that the user can perceive the special ring and/or vibration triggered by the mobile phone, thereby the mobile phone is triggered to trigger a special ring and/or vibration.

Step 404: Collect second sound sensing information if the information processing request message is not processed within a second predetermined time.

In this embodiment, after the mobile phone generates the prompting information, the user does not process the received information processing request message within the second predetermined time, then the mobile phone identifies that the user may not be at the side of the mobile phone, so that the mobile phone is triggered to store the first gravity sensing information, the first sound sensing information and the first light sensing information. It should be noted that the second predetermined time may be equal to the first predetermined time, or may be smaller than the first predetermined time. In this embodiment, it is preferred that the second predetermined time is smaller than the first predetermined time, for example, the first predetermined time may be 5 minutes, and the second predetermined time may be 1 minute. In this embodiment, after the mobile phone generates the prompting information, if the user does not process the received information processing request message within the second predetermined time, the mobile phone identifies that the user may not be at the side of the mobile phone, so that the mobile phone is triggered to collect the second sound sensing information.

Step 405: Generate the prompting information if the decibel of the second sound sensing information is greater than the decibel of the first sound sensing information.

In this embodiment, the user returns to the bedroom from another room, and a sound is generated in the bedroom due to activities such as walking or speaking, etc., so that the decibel of the second sound sensing information collected by the mobile phone is greater than the decibel of the first sound sensing information, thereby the mobile phone identifies that the user may be around the mobile phone and may perceive the special ring and/or vibration triggered by the mobile phone. Thus, the mobile phone is triggered to trigger a special ring and/or vibration to prompt the user of the call request message received by the mobile phone which is not processed in time.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information meet the seventh preset condition, the user equipment generates the prompting information to prompt the user of the information processing request message that is not processed in time. If the user does not process the information processing request message within the second predetermined time, the user equipment identifies that the user may not be in the vicinity of the mobile phone, thereby the user equipment is triggered to collect the second sound sensing information. If the decibel of the second sound sensing information is greater than the decibel of the first sound sensing information, the user equipment generates the prompting information again, so that the user equipment can identify, according to the change of environment, whether the user equipment needs to prompt the user of the information processing request message received by the user equipment which is not processed in time, and the user can in time perceive the information processing request message that has been received by the user equipment but not processed in time, and therefore, the usability of the user equipment may also be effectively improved.

Figure 5:
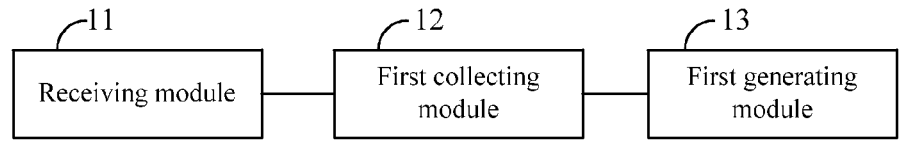
FIG. 5 is a structural schematic diagram of the user equipment according to an embodiment of the disclosure.

FIG. 5 is a structural schematic diagram of the user equipment according to an embodiment of the disclosure. As shown in FIG. 5, the user equipment of this embodiment includes: a receiving module 11, a first collecting module 12 and a first generating module 13. The receiving module 11 is configured to receive an information processing request message; the first collecting module 12 is configured to collect at least one type of environment state information if the information processing request message is not processed within a first predetermined time; and the first generating module 13 is configured to generate the prompting information according to the collected environment state information, so as to prompt a user to process the information processing request message.

The user equipment according to this embodiment may be configured to perform the technical solution of the method embodiment shown in FIG. 1. The implementing principle thereof is similar, so it is not described again here.

In this embodiment, if the received information processing request message is not processed within the first predetermined time, at least one type of environment state information is collected, and the prompting information is generated according to the collected environment state information, so as to prompt the user to process the information processing request message, so that the user equipment may generate, according to the environment identified under which the user equipment exists, the prompting information to prompt the user of the information processing request message, thereby the user can perceive in time the information processing request message that has been received by the user equipment but not processed in time, and thus the usability of the user equipment may be effectively improved.

Moreover, the first generating module 13 is configured to generate the prompting information if the collected environment state information meets a preset condition, wherein the environment state information includes one or any combination of the following information: the first gravity sensing information, the first sound sensing information and the first light sensing information, and the preset condition includes at least one type of the following conditions: the first gravity sensing information is smaller than the preset vibration amplitude, the first sound sensing information is smaller than the preset decibel, and the first light sensing information is greater than the preset light intensity.

Figure 6:
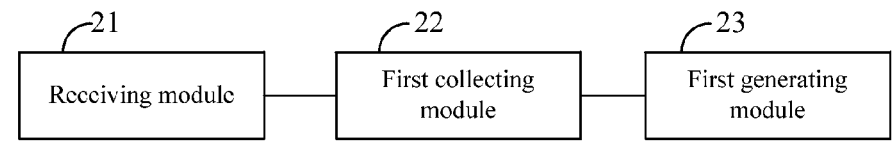
FIG. 6 is a structural schematic diagram of the user equipment according to another embodiment of the disclosure.

FIG. 6 is a structural schematic diagram of the user equipment according to another embodiment of the disclosure. As shown in FIG. 6, the mobile terminal communication equipment includes: a receiving module 21, a first collecting module 22 and a first generating module 23. The receiving module 21 is configured to receive an information processing request message; the first collecting module 22 is configured to collect at least one type of environment state information if the information processing request message is not processed within a first predetermined time; and the first generating module 23 is configured to generate prompting information if the collected environment state information meets a preset condition. The first collecting module 22 is further configured to continue to collect the environment state information if the collected environment state information fails to meet the preset condition.

Moreover, the first collecting module 22 may be further configured to continue to collect a part of the environment state information if the collected environment state information fails to meet the preset condition, where the part of the environment state information includes: all the environment state information which fails to meet the preset condition in the environment state information; or a part of the environment state information which fails to meet the preset condition in the environment state information; or a part of the environment state information selected from the environment state information.

The user equipment of this embodiment may be configured to perform the technical solution of the method embodiment shown in FIG. 2. The implementing principle thereof is similar, so it is not described again here.

In this embodiment, if the received information processing request message is not processed within the first predetermined time, the user equipment collects the first gravity sensing information and the first sound sensing information. If the first gravity sensing information and the first sound sensing information meet the fourth preset condition, the user equipment generates the prompting information according to the first gravity sensing information and the first sound sensing information, so that the user equipment identifies whether the user may perceive the prompting information generated by the user equipment according to the movement status of the user equipment itself and the sound in the environment in which the user equipment exists. Thereby in the case that the user can perceive the prompting information generated by the user equipment, the user equipment is triggered to generate the prompting information to prompt the user to process the information processing request message, and thus the user can be effectively made to in time perceive the information processing request message that has been received by the user equipment but not processed in time, and the usability of the user equipment can be effectively improved.

Figure 7:
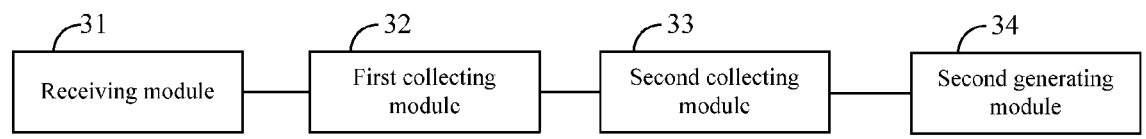
FIG. 7 is a structural representation of the user equipment according to yet another embodiment of the disclosure.

FIG. 7 is a structural schematic diagram of the user equipment according to yet another embodiment of the disclosure. As shown in FIG. 7, the mobile terminal communication equipment includes: a receiving module 31, a first collecting module 32, a second collecting module 33 and a second generating module 34. The receiving module 31 is configured to receive an information processing request message; the first collecting module 32 is configured to collect the first gravity sensing information, the first sound sensing information and the first light sensing information if the information processing request message is not processed within a first predetermined time; the second collecting module 33 is configured to collect the second light sensing information if the collected environment state information fails to meet a preset condition; the second generating module 34 is configured to generate the prompting information if the light intensity of the second light sensing information is greater than the light intensity of the first light sensing information.

The user equipment of this embodiment may be configured to perform the technical solution of the method embodiment shown in FIG. 3. The implementing principle thereof is similar, so it is not described again here.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information fail to meet the seventh preset condition, the user equipment collects the second light sensing information in real time. When the light intensity of the second light sensing information is greater than the light intensity of the first light sensing information, the user equipment generates the prompting information, so that the mobile phone can be triggered to generate the prompting information according to the movement status of the mobile phone itself, the change of the light and the sound in the environment in which the mobile phone exists, thereby the user can in time perceive the information processing request message that has been received by the user equipment but not processed in time. Therefore, the usability of the user equipment may also be effectively improved.

Figure 8:
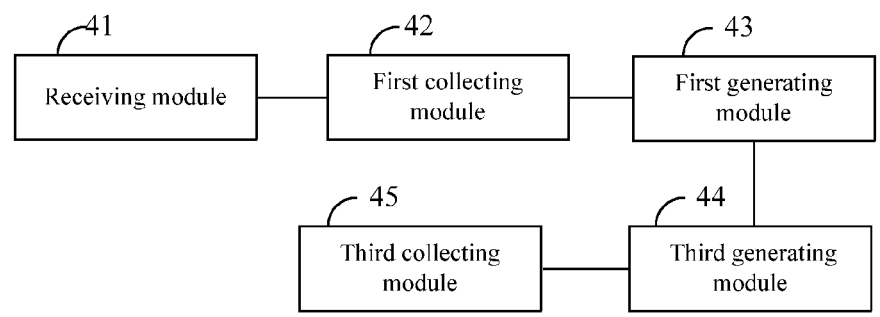
FIG. 8 is a structural schematic diagram of the user equipment according to still another embodiment of the disclosure.

FIG. 8 is a structural schematic diagram of the user equipment according to still another embodiment of the disclosure. As shown in FIG. 8, the mobile terminal communication equipment includes: a receiving module 41, a first collecting module 42, a first generating module 43, a third collecting module 44 and a third generating module 45. The receiving module 41 is configured to receive an information processing request message; the first collecting module 42 is configured to collect the first gravity sensing information, the first sound sensing information and the first light sensing information if the information processing request message is not processed within a first predetermined time; the first generating module 43 is configured to generate the prompting information if the collected environment state information meets a preset condition, wherein the environment state information includes the first gravity sensing information, the first sound sensing information or the first light sensing information, and the preset condition includes at least one type of the following conditions: the first gravity sensing information is smaller than a preset vibration amplitude, the first sound sensing information is smaller than a preset decibel, and the first light sensing information is greater than a preset light intensity. The third collecting module 44 is configured to collect the second sound sensing information if the information processing request message is not processed within a second predetermined time. The third generating module 45 is configured to generate the prompting information if the decibel of the second sound sensing information is greater than the decibel of the first sound sensing information.

The user equipment of this embodiment may be configured to perform the technical solution of the method embodiment shown in FIG. 4. The implementing principle thereof is similar, so it is not described again here.

In this embodiment, if the received information processing request message is not processed within the first predetermined time, the user equipment collects the first gravity sensing information, the first sound sensing information and the first light sensing information. If the first gravity sensing information, the first sound sensing information and the first light sensing information meet the seventh preset condition, the user equipment generates the prompting information to prompt the user of the information processing request message that has been received by the user equipment but not processed in time. If the user does not process the information processing request message within the second predetermined time, the user equipment identifies that the user may not be in the vicinity of the mobile phone, thereby the user equipment is triggered to collect the second sound sensing information. When the decibel of the second sound sensing information is greater than the decibel of the first sound sensing information, the user equipment generates the prompting information again, so that the user equipment can identify, according to the change of environment, whether the user equipment needs to prompt the user to perceive the information processing request message that has been perceived by the user equipment but not processed in time, and the user can in time perceive the information processing request message that has been received by the user equipment but not processed in time. Therefore, the usability of the user equipment may also be effectively improved.

One of ordinary skills in the art may understand that, all or a part of the steps for implementing the foregoing method embodiment may be accomplished by program instruction-related hardware, and the foregoing program may be stored in a computer-readable storage medium. When executed, the program may perform the steps included in the foregoing method embodiment. The foregoing storage medium includes various media that can store program codes, such as read-only memory (ROM), random access memory (RAM), diskette or compact disc.

Finally, it should be noted that the foregoing embodiments are only used to illustrate the technical solutions of the disclosure, rather than limiting the scope thereof. Although the disclosure has been illustrated in detail by referring to the foregoing embodiments, one of ordinary skills in the art may understand that modifications may still be made on the technical solutions described in the foregoing various embodiments or equivalent substitutions may be made on a part of the technical features thereof. However, all these modifications or substitutions do not make the essence of the corresponding technical solutions depart from the spirit and scope of the technical solutions of various embodiments of the disclosure.

What is claimed is:

1. An apparatus comprising:
   at least one sensor;
   at least one memory for storing computer instructions; and
   at least one processor configured to execute the computer instructions to perform operations of:
   receiving at least one information processing request message;
   receiving a value of a first environmental state parameter when the information processing request message is not processed within a first predetermined time;
   receiving a value of a second environmental state parameter when the information processing request message is not processed within a second predetermined time;
   receiving the value of the second environmental state parameter when the value of the first environmental state parameter meets a first preset condition and the value of the second environmental state parameter fails to meet a second preset condition; and
   generating prompting information when the value of the first environmental state parameter meets the first preset condition and the value of the second environmental state parameter meets the second preset condition, wherein the prompting information is used to prompt a user to process the information processing request message.

2. The apparatus according to claim 1, wherein the first environmental state parameter and the second environmental state parameter comprises at least one of following parameters: a gravity sensing parameter, a sound sensing parameter, or a light sensing parameter.

3. The apparatus according to claim 2, wherein a value of the gravity sensing parameter comprises a value obtained through obtaining a movement amplitude of at least a part of the apparatus.

4. The apparatus according to claim 2, wherein a value of the sound sensing parameter comprises a value obtained through collecting a decibel level of an environment where at least a part of the apparatus exists.

5. The apparatus according to claim 2, wherein a value of the light sensing parameter comprises a value obtained through collecting a light intensity of an environment where at least a part of the apparatus exists.

6. The apparatus according to claim 2, wherein the first preset condition and the second preset condition comprises at least one of the following conditions:
   a value of the gravity sensing parameter is smaller or greater than a preset movement amplitude;
   a value of the sound sensing parameter is smaller or greater than a preset decibel level; or
   a value of the light sensing parameter is smaller or greater than a preset light intensity.

7. The apparatus according to claim 1, wherein a type of the first environmental state parameter is different from a type of the second environmental state parameter.

8. The apparatus according to claim 1, wherein the first preset condition is the same as the second preset condition.

9. The apparatus according to claim 1, wherein the first predetermined time is the same as the second predetermined time.

10. A prompting information generating system, comprising:
   a first device which comprises:
      a first sensor;
      a first memory for storing computer instructions; and
      a first processor configured to execute the computer instructions, wherein the first processor of the first device is configured to:
         receive an information processing request message; and
         receive a value of a first environmental state parameter when the information processing request message is not processed within a first predetermined time; and
         receive the value of the first environmental state parameter when the value of the first environmental state parameter fails to meet a first preset condition; and
   a second device which comprises:
      a second sensor;
      a second memory for storing computer instructions; and
      a second processor configured to execute the computer instructions, wherein the second processor of the second device is configured to:
         receive a value of a second environmental state parameter when the information processing request message is not processed within a second predetermined time; and
         receive the value of the second environmental state parameter when the value of the second environmental state parameter fails to meet the second preset condition,
   wherein the processor of the first device or the processor of the second device is configured to generate prompting information when the value of the first environmental state parameter meets the first preset condition and the value of the second environmental state parameter meets the second preset condition, and wherein the prompting information is used to prompt a user to process the information processing request message.

11. The prompting information generating system according to claim 10, wherein the first environmental state parameter and the second environmental state parameter comprises at least one of following parameters: a gravity sensing parameter, a sound sensing parameter, or a light sensing parameter.

12. The prompting information generating system according to claim 11, wherein a value of the gravity sensing parameter comprises a value obtained through collecting a movement amplitude of at least a part of the prompting information generating system, wherein a value of the sound sensing parameter comprises a value obtained through collecting a decibel level of an environment where at least a part of the prompting information generating system exists, and wherein a value of the light sensing parameter comprises a value obtained through collecting a light intensity of the environment where at least a part of the prompting information generating system exists.

13. The prompting information generating system according to claim 11, wherein the first preset condition and the second preset condition comprises at least one of the following conditions:
   a value of the gravity sensing parameter is smaller or greater than a preset movement amplitude;
   a value of the sound sensing parameter is smaller or greater than a preset decibel; or
   a value of the light sensing parameter is smaller or greater than a preset light intensity.

14. The prompting information generating system according to claim 10, wherein a type of the first environmental state parameter is different from a type of the second environmental state parameter.

15. The prompting information generating system according to claim 10, wherein the first preset condition is the same as the second preset condition.

16. The prompting information generating system according to claim 10, wherein the first predetermined time is the same as the second predetermined time.

17. An prompting information generating device comprising:
   a sensor;
   a memory for storing computer instructions;
   a processor configured to execute the computer instructions to perform operations of:
      receiving an information processing request message;
      receiving a value of a first environmental state parameter associated with the prompting information generating device when the information processing request message is not processed by the prompting information generating device within a first predetermined time;
      receiving a value of a second environment state parameter associated with the prompting information generating device when the value of the first environmental state parameter fails to meet a first preset condition; and
      generating prompting information when the value of the second environment state parameter meet a second preset condition or the values of the first environment state parameters and the second environment state parameters meet the first preset condition and the second preset condition, respectively, and wherein the prompting information is used to prompt a user to process the information processing request message.

18. The prompting information generating device according to claim 17, wherein the first environmental state parameter or the second environmental state parameter comprises at least one of following parameters: a gravity sensing parameter, a sound sensing parameter, or a light sensing parameter.

19. The prompting information generating device according to claim 18, wherein a value of the gravity sensing parameter comprises a value obtained through collecting a movement amplitude of the prompting information generating device, wherein a value of the sound sensing parameter comprises a value obtained through collecting a decibel level of the environment where the prompting information generating device exists, and wherein a value of the light sensing parameter comprises a value obtained through collecting a light intensity of an environment where the prompting information generating device exists.

20. The prompting information generating device according to claim 18, wherein a preset condition comprises at least one of the following conditions:
   a value of the gravity sensing parameter is smaller or greater than a preset movement amplitude;
   a value of the sound sensing parameter is smaller or greater than a preset decibel; or a value of the light sensing parameter is smaller or greater than a preset light intensity.

21. The prompting information generating device according to claim 17, wherein a type of the first environmental state parameter is different from a type of the second environmental state parameter.

22. The prompting information generating device according to claim 17, wherein the first preset condition is the same as the second preset condition.

\* \* \* \* \*